UNITED STATES PATENT OFFICE.

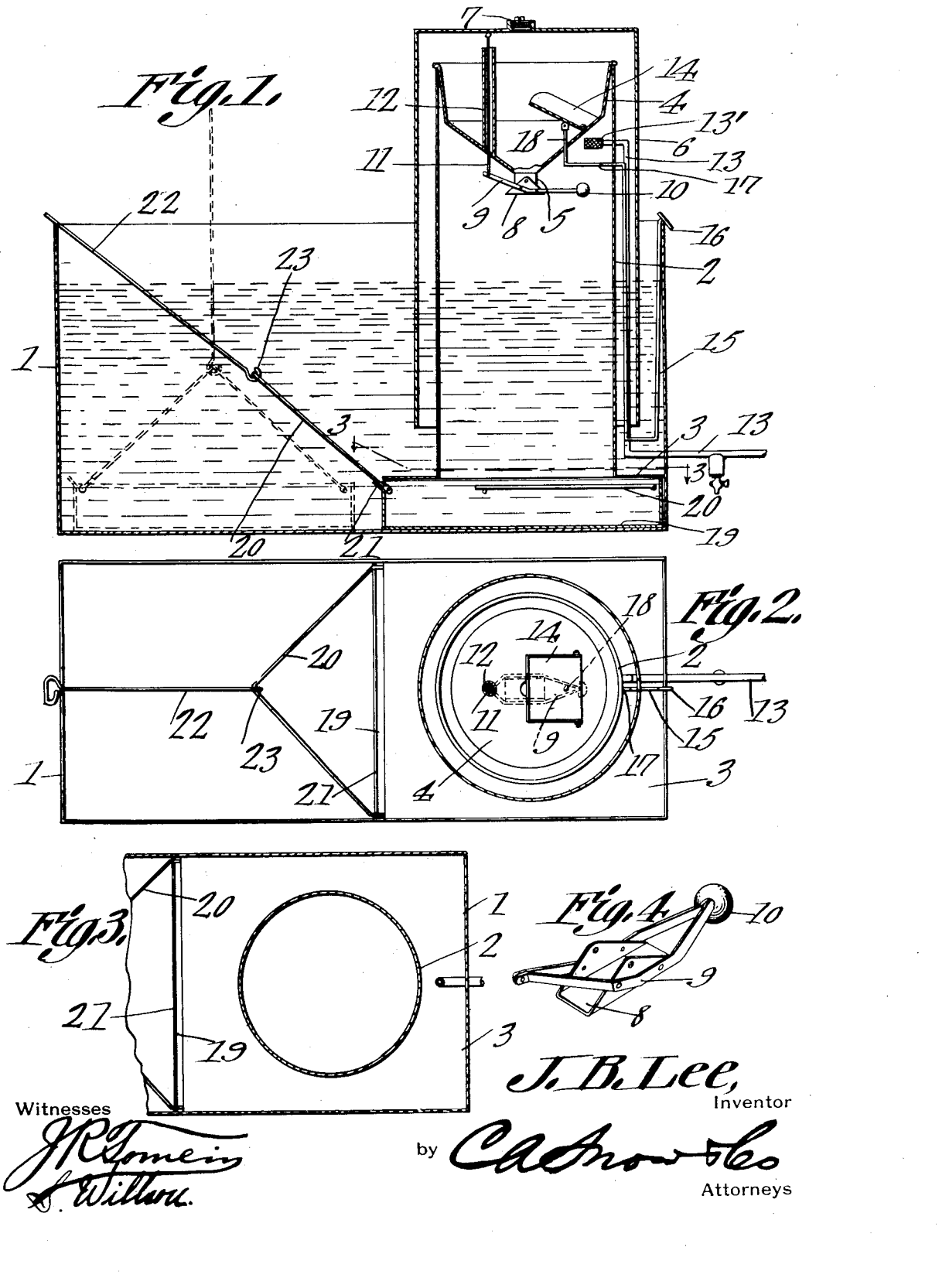

JAMES BIRD LEE, OF CHANDLER, INDIANA.

ACETYLENE-GAS GENERATOR.

1,108,197.

Specification of Letters Patent. Patented Aug. 25, 1914.

Application filed October 6, 1913. Serial No. 793,707.

*To all whom it may concern:*

Be it known that I, JAMES B. LEE, a citizen of the United States, residing at Chandler, in the county of Warrick and State of Indiana, have invented a new and useful Acetylene-Gas Generator, of which the following is a specification.

The present invention appertains to acetylene gas generators, and aims to provide a novel and improved apparatus of that character.

The object of the present invention, is to provide a sludge pan, adapted to be normally disposed below the carbid column, and means whereby the sludge pan may be withdrawn from under the carbid column and then lifted from the water reservoir.

With the foregoing and other objects in view, which will be apparent as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein—

Figure 1 is a longitudinal vertical central section of the apparatus. Fig. 2 is a plan view of the apparatus, the bell being shown in section. Fig. 3 is a sectional detail taken on the line 3—3 of Fig. 1. Fig. 4 is an enlarged perspective view of the carbid feeder.

The present acetylene gas generator embodies a water reservoir or tank 1, which is preferably of rectangular outline. Within one end of the reservoir or tank 1 is disposed an upright cylindrical shell 2 forming a column or shaft, the lower end of which is spaced slightly above the bottom of the water reservoir or tank, and is provided with a flange 3 secured to the sides and respective end of the water tank, to provide a receptacle therebelow for the sludge pan, as will hereinafter appear. Secured within the upper end of the column 2, is the carbid holder or hopper 4, which is provided with the lower discharge spout 5. The gas bell 6, which may be of any desirable size, is disposed over the column 2, and has its lower open end disposed within the water contained within the tank 1. The top of the bell 6 is provided with a removable closure 7 for refilling the hopper or holder 4 when the supply of carbid has been exhausted.

The carbid feeder 8 has its sides pivoted to the sides of the spout 5, and a lever 9 is secured to the feeder 8, and is provided with a weight 10 at one end, and with a stem 11 pivoted to its other end, the weight 10 balancing the stem 11 and holding the feeder 8 level under ordinary conditions. The stem 11 passes upwardly through an upstanding tube 12 secured to the hopper 4, in order that when the bell descends, as the acetylene gas is drawn off, the top of the bell 6 will push the stem 11 downwardly, and will thereby swing the feeder 8, to discharge sufficient carbid into the water within the lower portion of the column 2, so as to reëstablish the charging of the bell 6. As the bell 6 rises, it will liberate the stem 11, and consequently, the feeder 8 will return to normal position, it being observed that the feeder is spaced slightly below the spout 5 of the carbid hopper, in order that the carbid may settle upon the feeder, without discharging, until the feeder is tilted under the weight of the gas bell.

The gas outlet pipe 13 enters the water tank 1 below the lower end of the gas bell 6, and projects upwardly between the gas bell and the column 2, the upper end of the pipe 13 being equipped with a strainer 13 above the water level.

One of the cardinal features of the present invention resides in the provision of a reserve carbid holder within the hopper 4 and means for releasing the said holder, after the hopper has been emptied. To this end, a scoop-shaped member 14 is hinged or pivoted within the hopper 4, and is adapted to be normally held in an inclined position, as seen in Fig. 1, to hold in reserve, a quantity of the carbid within the hopper, so as to prevent the reserve carbid from being discharged through the spout 5, until the holder 14 is liberated.

The means for normally holding the scoop 14 in inclined position, and for liberating the scoop, embodies a U-shaped bar or rod 15 passing below the lower end of the bell 6, with its outer arm disposed between the bell and the tank 1, and with its inner arm disposed between the bell 6 and the column 2. The outer arm of the member 15 is provided with a hook 16 adapted to engage the upper edge of the water tank 1, to support the member 15, and the inner arm of the said member 15 is provided with an angular portion 17 at its upper end passing slidably through the column 2 and terminating in an upstanding stem 18 passing slidably through the hopper 4 beneath the scoop or auxiliary holder 14.

The construction of the member 15 is such, that when the hook 16 is engaged over the upper edge of the water tank, the stem 18 will be projected upwardly so as to contact with the bottom of the scoop 14 to hold the scoop in elevated position. In this condition, the scoop will hold in reserve, a suitable quantity of the carbid, as above indicated, and to liberate the reserve carbid, it is merely necessary for the operator to release the hook 16 from the upper edge of the water tank, and to permit the member 15 to drop, which will retract the stem 18 and permit the scoop or auxiliary holder 14 to swing downwardly, so as to release the reserve carbid. The advantages of this arrangement will be clearly obvious without further description.

The sludge pan 19 is adapted to rest upon the bottom of the water tank and is arranged to be slid underneath the flange 3 of the column 2, so as to receive the sludge or precipitates from the column 2. The sludge pan 19 has V-shaped bails 20 pivoted within its opposite ends, one of the bails being adapted to pass underneath the column 2 with the sludge pan and normally lie below the column within the pan, while the other bail is designed to project outwardly or upwardly from the respective end of the sludge pan, as seen in Fig. 1. In order to support the outwardly projecting bail, the respective end of the pan 19 is provided with an inclined lip 21 upon which the respective bail 20 may rest, to support the bail in an inclined position, as seen in the drawings.

A handle 22 is provided for manipulating the sludge pan, and has a hook 23 at its lower end. To remove the sludge pan, the handle 22 is projected into the water tank, and the hook 23 thereof engaged with the crotch of the outstanding bail 20, which will permit the sludge pan to be conveniently slid from under the column 2, as seen in dotted lines in Fig. 1. After the sludge pan has been thus withdrawn, from under the column 2, the handle 22 may be manipulated so as to engage the hook 23 with both bails, and when the hook 23 has been engaged with the crotches of the two bails, the sludge pan may be conveniently lifted or elevated above the water tank, to permit the sludge to be discharged.

The sludge pan may be readily submerged by means of the handle 22, as will be apparent, and after the bail nearest the column 2 has been released, the handle 22 may be employed for sliding the sludge pan underneath the column 2. In the manner described, the sludge pan may be conveniently manipulated, without the necessity of the operator reaching into the tank or reservoir.

Having thus described the invention, what is claimed as new is:—

In a device of the character described, a tank, a hollow column disposed therein, a removable pan seated on the tank bottom below the column, bails pivoted to the opposite portions of the pan, one bail normally lying within the pan, and the other bail normally projecting from the pan to one side of the column, the pan having means for supporting the last mentioned bail in an inclined position, and a handle having a hook engageable with the last mentioned bail for pulling the pan from under the column, and then engageable with both of the bails to lift the pan from the tank.

In testimony that I claim the foregoing as my own, I have hereto affixed my signature in the presence of two witnesses.

JAMES BIRD LEE.

Witnesses:
WILLIAM H. ANDERSON,
W. H. ANDERSON, Jr.